(12) United States Patent
Haddad, Jr.

(10) Patent No.: US 6,464,283 B2
(45) Date of Patent: Oct. 15, 2002

(54) CONTAINER COVERING SYSTEM WITH HYDRAULIC OR PNEUMATIC ACTUATION

(75) Inventor: Edward N. Haddad, Jr., Worcester, MA (US)

(73) Assignee: Pioneer Consolidated Corporation, North Oxford, MA (US)

( * ) Notice: Subject to any disclaimer, the term of this patent is extended or adjusted under 35 U.S.C. 154(b) by 0 days.

(21) Appl. No.: 09/729,369

(22) Filed: Dec. 4, 2000

(65) Prior Publication Data

US 2002/0067048 A1 Jun. 6, 2002

Related U.S. Application Data

(60) Provisional application No. 60/176,286, filed on Jan. 14, 2000, and provisional application No. 60/170,930, filed on Dec. 14, 1999.

(51) Int. Cl.[7] .................................................. B60P 7/04
(52) U.S. Cl. ................ 296/98; 296/100.14; 296/100.15
(58) Field of Search .............................. 296/98, 100.01, 296/101, 100.15, 100.17, 100.18, 100.14

(56) References Cited

U.S. PATENT DOCUMENTS

| | | | | |
|---|---|---|---|---|
| 3,975,047 A | * | 8/1976 | McClellan | 296/100.14 |
| 4,030,780 A | * | 6/1977 | Petretti | 296/98 |
| 4,082,347 A | * | 4/1978 | Petretti | 296/98 |
| 4,341,416 A | * | 7/1982 | Richard | 296/98 |
| 5,031,955 A | * | 7/1991 | Searfoss | 296/98 |
| 5,058,956 A | * | 10/1991 | Godwin, Sr. | 296/100.14 |
| 5,125,713 A | * | 6/1992 | Willingham et al. | 296/98 |
| 5,238,287 A | * | 8/1993 | Haddad, Jr. | 296/98 |
| 5,957,523 A | | 9/1999 | Haddad, Jr. | 296/98 |
| 6,338,521 B1 | * | 1/2002 | Henning | 296/100.14 |

* cited by examiner

*Primary Examiner*—D Glenn Dayoan
*Assistant Examiner*—Patricia L. Engle
(74) *Attorney, Agent, or Firm*—Weingarten, Schurgin, Gagnebin & Lebovici LLP

(57) ABSTRACT

A covering system for a container body of a dump truck or roll-off dumpster with a rollable cover uses a pair of pivot arms attached to a leading edge of the cover. A shaft is transversely disposed and rotatably supported by an underside of the container body. Each pivot arm has a lower end fixedly attached to ends of the shaft for rotation with the shaft. A hydraulic or pneumatic rotation actuation mechanism operative to rotate the shaft is mounted to the underside of the container body, where it is not likely to be damaged during loading operations. The pivot arms are also readily kept in synchronization by operation of a single rotation actuation mechanism. A hydraulically or pneumatically actuated cover hold-down tensioning device is also provided, which may be operative in cooperative sequence with the covering system.

21 Claims, 15 Drawing Sheets

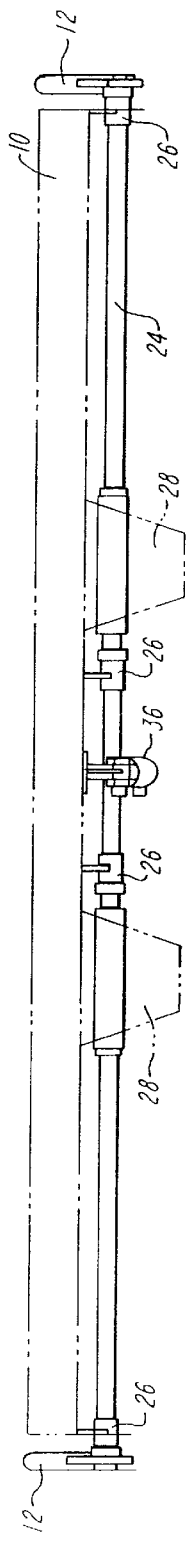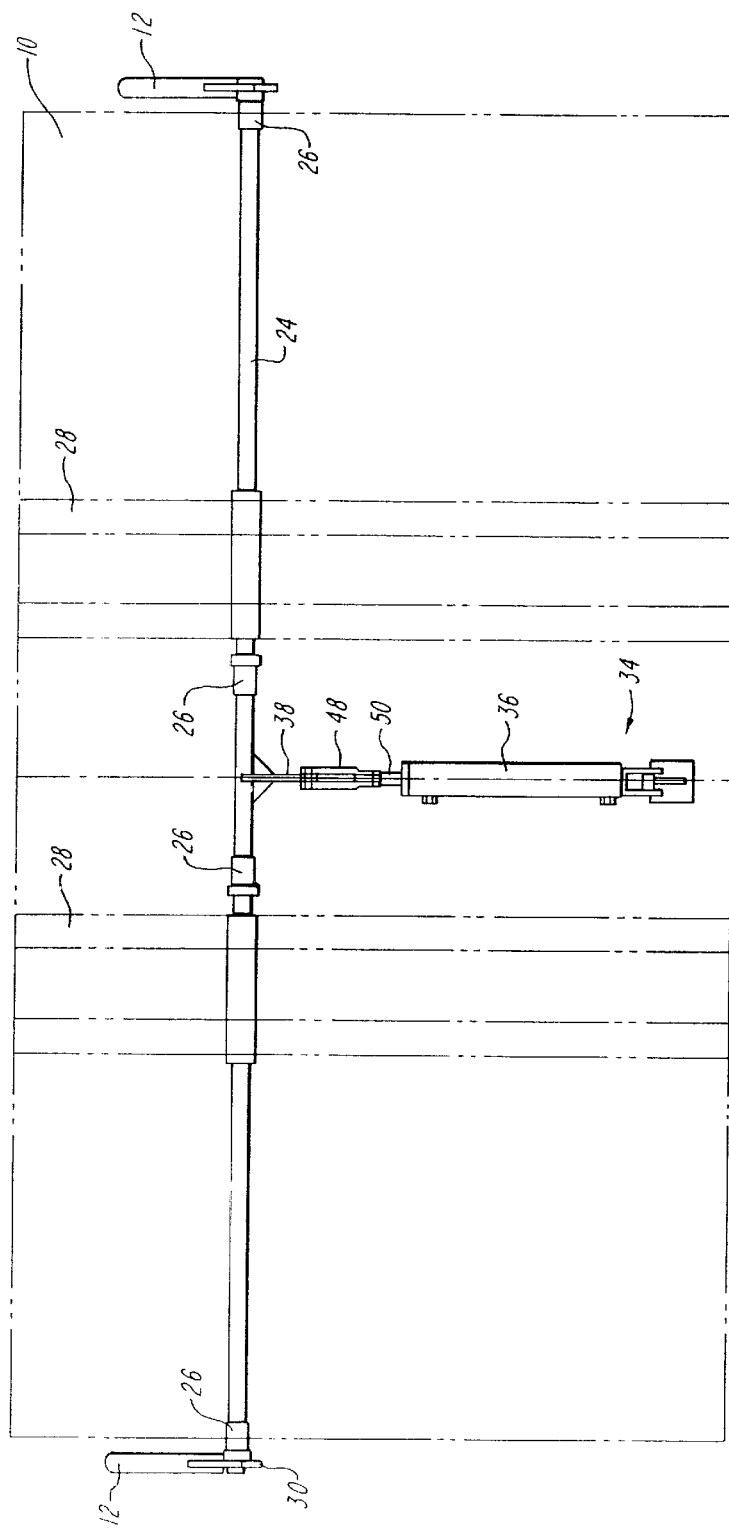
FIG. 3
FIG. 4

CONTAINER COVERING SYSTEM WITH HYDRAULIC OR PNEUMATIC ACTUATION

CROSS REFERENCE TO RELATED APPLICATIONS

Applicant claims priority under 35 U.S.C. §119(e) of U.S. Provisional Application No. 60/170,930, filed Dec. 14, 1999, and to U.S. Provisional Application No. 60/176,286, filed Jan. 14, 2000, the disclosures of which are incorporated by reference hereon.

STATEMENT REGARDING FEDERALLY SPONSORED RESEARCH OR DEVELOPMENT

N/A

BACKGROUND OF THE INVENTION

Open top container bodies or receptacles such as those used on dump trucks and roll-off trash dumpsters often hold loads that are easily agitated by forces from bumpy roads, external winds, and the air stream created by vehicular movement. Accordingly, a flexible cover is often secured on top of these container bodies to shield the contents. Container bodies are often up to forty feet long and as wide as the vehicle upon which they are carried, and the covers for such large bodies are themselves large and unwieldy. Some form of mechanical assistance is thus often used to furl and unfurl the covers over the bodies.

Prior art truck covering systems typically provide a flexible cover that is attached at one end to a crossbar that extends transversely across the open top of a container body. The other end of the cover is attached to a roller, which is mounted to a cab shield at the front edge of the container body. A pair of pivoting arms connected to the crossbar is mounted on the sides of the container body and is actuated by hydraulic or pneumatic cylinders, also mounted on the sides of the container body. Pivoting actuation of the arms causes the cover to be drawn from the roller over the open top of the container body.

Because the arms and cylinders are mounted on the sides of the container body, they are vulnerable to being hit during loading operations. Also, some mechanism to keep the arms in synchronization during movement is preferably provided to minimize wear on the covers.

A truck cover system having a hold down tensioning device is also known. In this system, spring biased arms attached to a tensioning bar urge the cover toward the top edge of the container body, keeping the tensioned cover close to the top edge of the sides of the body. See U.S. Pat. No. 5,957,523, the disclosure of which is incorporated by reference herein.

SUMMARY OF THE INVENTION

In the present invention, a covering system is provided having pivot arms connected to a common shaft that runs from side to side underneath the container body and that ensures the arms move in synchronization. The pivot arms are connected to the shaft at the outboard ends. The shaft is rotated by a mechanism that converts linear motion to rotary motion, such as a hydraulically or pneumatically operated bell crank. This mechanism is connected to the center of the shaft underneath the truck body, thereby keeping the mechanism out of harm's way and transmitting equal amounts of torque to the pivot arms, which in turn deploy the cover or tarp over the load. The covering system may be run with compressed air from the truck's air supply or hydraulic fluid provided by the truck's hydraulic system if the truck is equipped with a central hydraulic system that is used to run other functions, such as sanders and plows.

In a further embodiment, a tensioning device is provided comprising a hoop rotatably mounted to a front of the container body to travel an arcuate path between an uncovered position near a top of the roller mechanism and a covered position holding down the cover close to a top of the container body. The tensioning device may be actuated by the hydraulic or pneumatic circuit provided for actuating the covering system, or may be a standalone system.

DESCRIPTION OF THE DRAWINGS

The invention will be more fully understood from the following detailed description taken in conjunction with the accompanying drawings in which:

FIG. 3 is a partial rear view of the covering system of FIG. 1;

FIG. 4 is a bottom view of the covering system of FIG. 1;

DETAILED DESCRIPTION OF THE INVENTION

Figure 1:
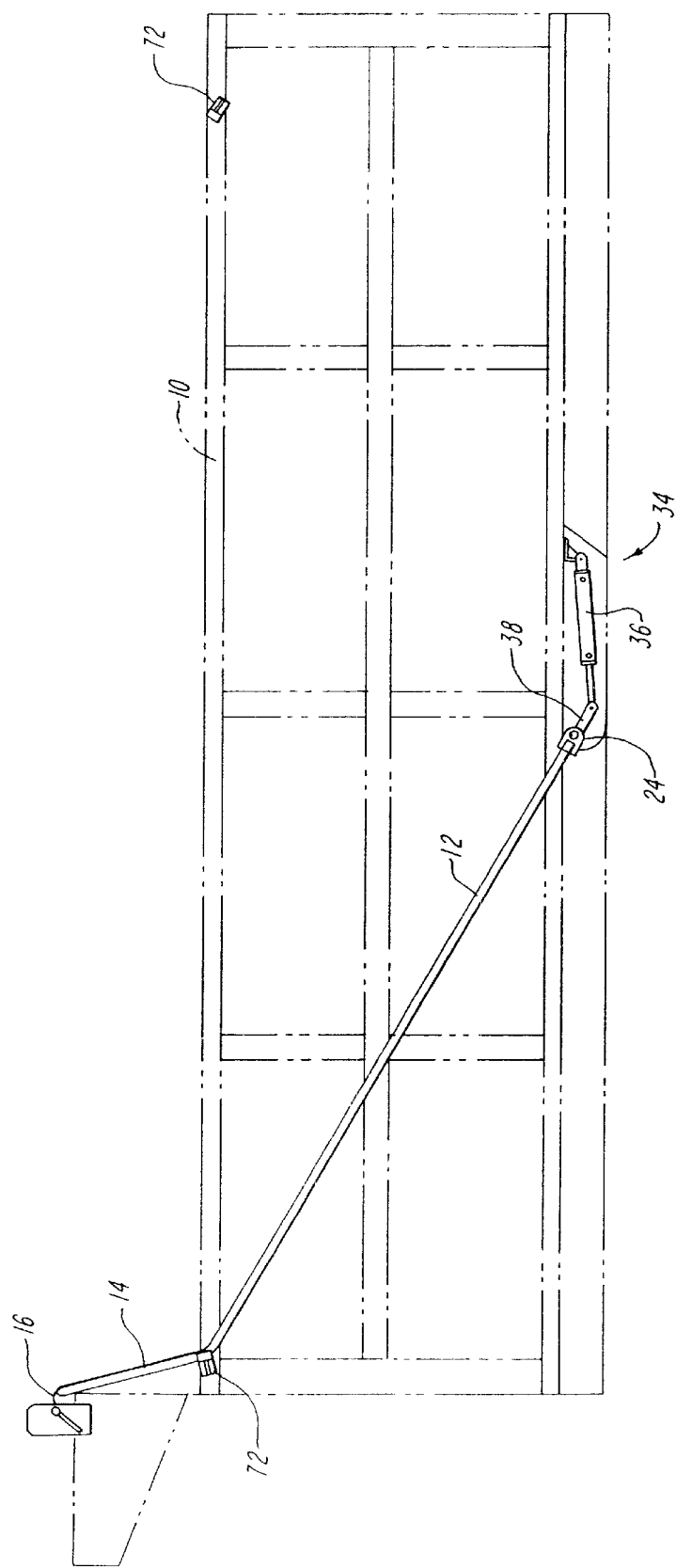
FIG. 1 is a side view of a hydraulically actuated covering system according to the present invention.
Figure 2:
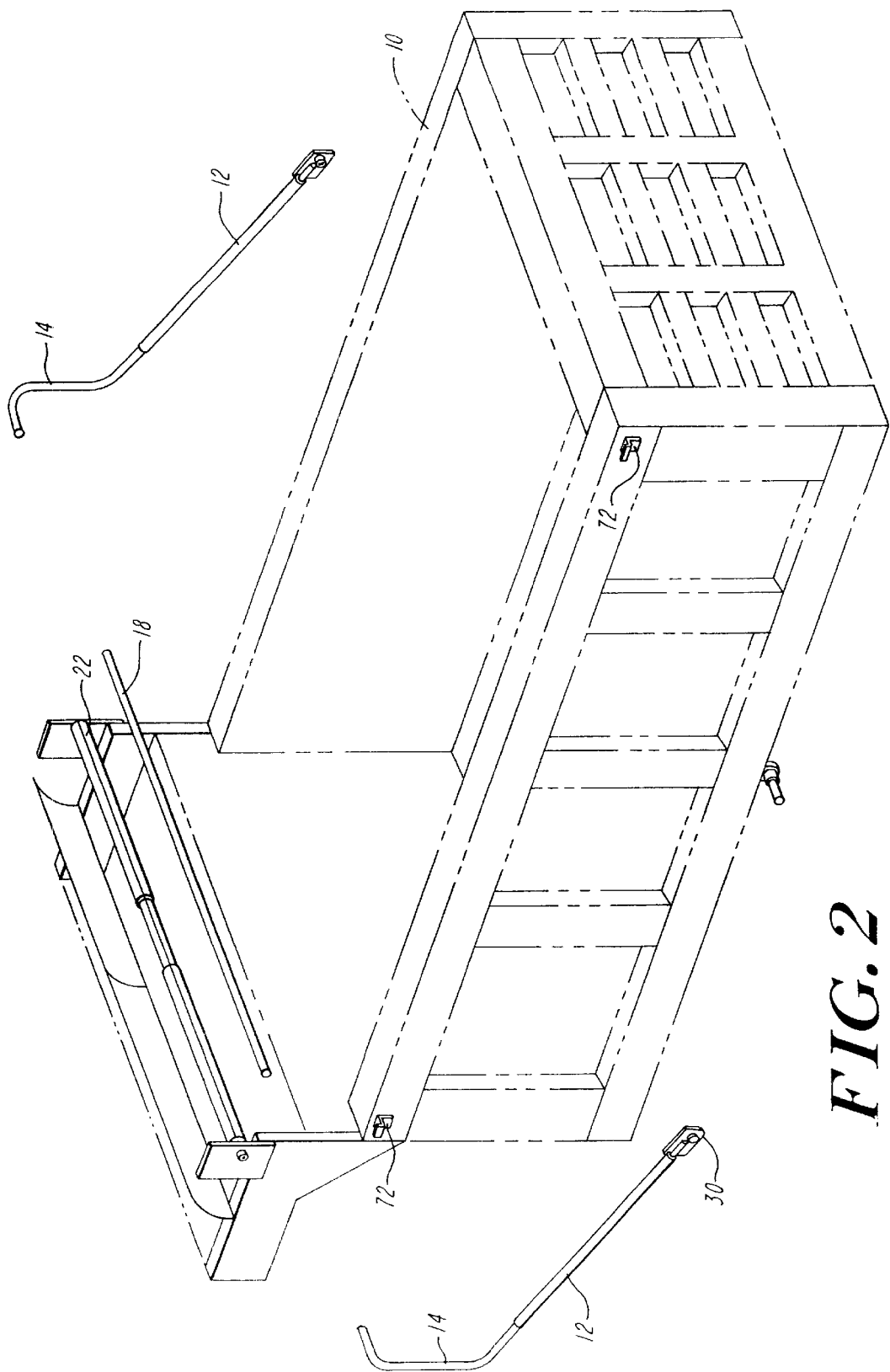
FIG. 2 is an exploded view of the covering system of FIG. 1.
Figure 5:
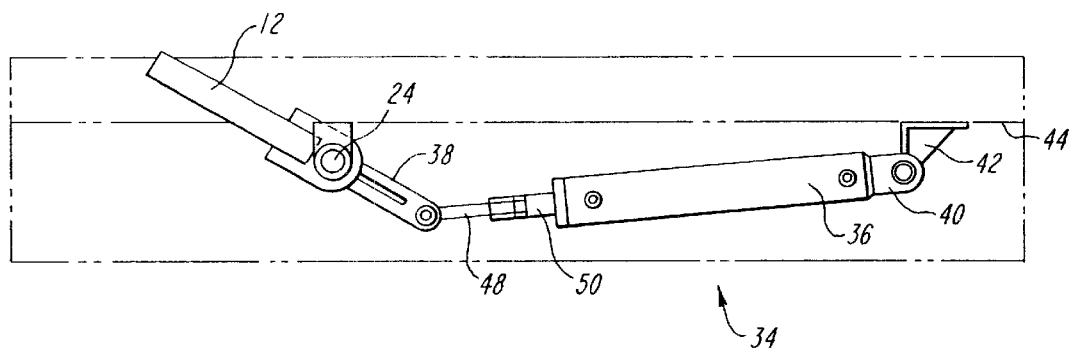
FIG. 5 is a partial side view of a rotation actuation mechanism operative with the system of FIG. 1.
Figure 6:
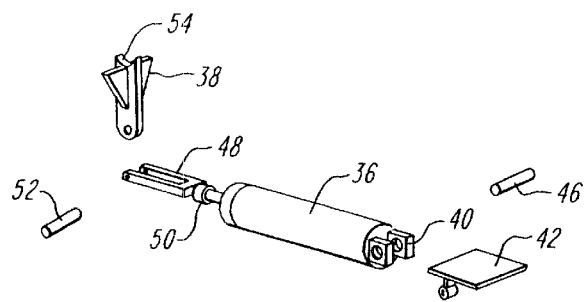
FIG. 6 is an exploded view of the rotation actuation mechanism of FIG. 5.

FIGS. 1–7 illustrate a covering or tarping system for a dump truck container body 10 according to the present invention. The covering system includes two pivot arms 12, one on each side of the container body. The pivot arms include bows 14 at their upper ends that are connected to a leading edge of a cover or tarp 16. Typically, a stiffening rod 18 is provided through a pocket along the leading edge; the bows are connected to the ends of the stiffening rod. The trailing edge of the cover is mounted to a spring-biased roller mechanism 22 mounted at the front of the container body, as known in the art.

A rotatable shaft 24 extends transversely underneath the container body 10 at generally the midpoint between the front and rear ends of the container body. The shaft 24 is supported for rotation along its longitudinal axis in any suitable manner to the container body, as by bushings 26 mounted to brackets welded to the underside surface of the container body. Four bushings are shown; it will be appreciated that any suitable number of bushings, or any other rotational support mechanism, may be provided. The shaft also passes through openings formed in the long sills or longitudinals 28 on the underside of the body 10. The area around the holes is preferably reinforced. On Canadian or heated bodies, cross tubes are welded into the sills to form protective passages for the shaft 24 and to contain the exhaust gases and stiffen the body at the holes in the sills.

The pivot arms 12 are rigidly connected in any suitable manner at their lower ends to the rotatable shaft 24. For example, a plate 30 may be welded or otherwise affixed to the lower end of the arm 12 and to the shaft. In this manner, when the shaft 24 is rotated, the pivot arms 12 pivot about the axis of the shaft.

A rotation actuation mechanism 34 is also mounted underneath the container body, generally in the middle thereof. In the presently preferred embodiment, the mechanism includes at least one hydraulic or pneumatic cylinder 36 and a bellcrank assembly 38 connected between the cylinder 36 and the shaft 24 for converting linear motion of the cylinder to rotary motion of the shaft. The size and number of cylinders are selected to achieve the desired actuation based on the available hydraulic or pneumatic pressure, as would be known in the art.

According to a first embodiment, the rotation actuation mechanism 34 is hydraulically actuated. For example, the cylinder 36 is hydraulic and is provided with a clevis 40 at the base end of the cylinder for mounting to a bracket 42 that is fixed to the underside 44 of the container body 10, for example, by welding or bolting. A clevis pin 46 with cotter fits through aligned openings on the clevis and the bracket to allow pivoting motion about the axis of the pin. A U-shaped yoke 48 is provided at the rod 50 of the cylinder 36. The bellcrank assembly 38 is pivotably attached to the yoke 48 with a clevis pin 52 with cotter. The bellcrank assembly is rigidly fastened to the shaft 24, for example, with a scalloped end 54 that fits the curvature of the shaft and that is welded thereto. Actuation of the hydraulic cylinder to extend or retract the rod 50 causes the bellcrank assembly 36 to pivot about the axis defined by the clevis pin 52, thereby causing rotation of the shaft.

Figure 7:
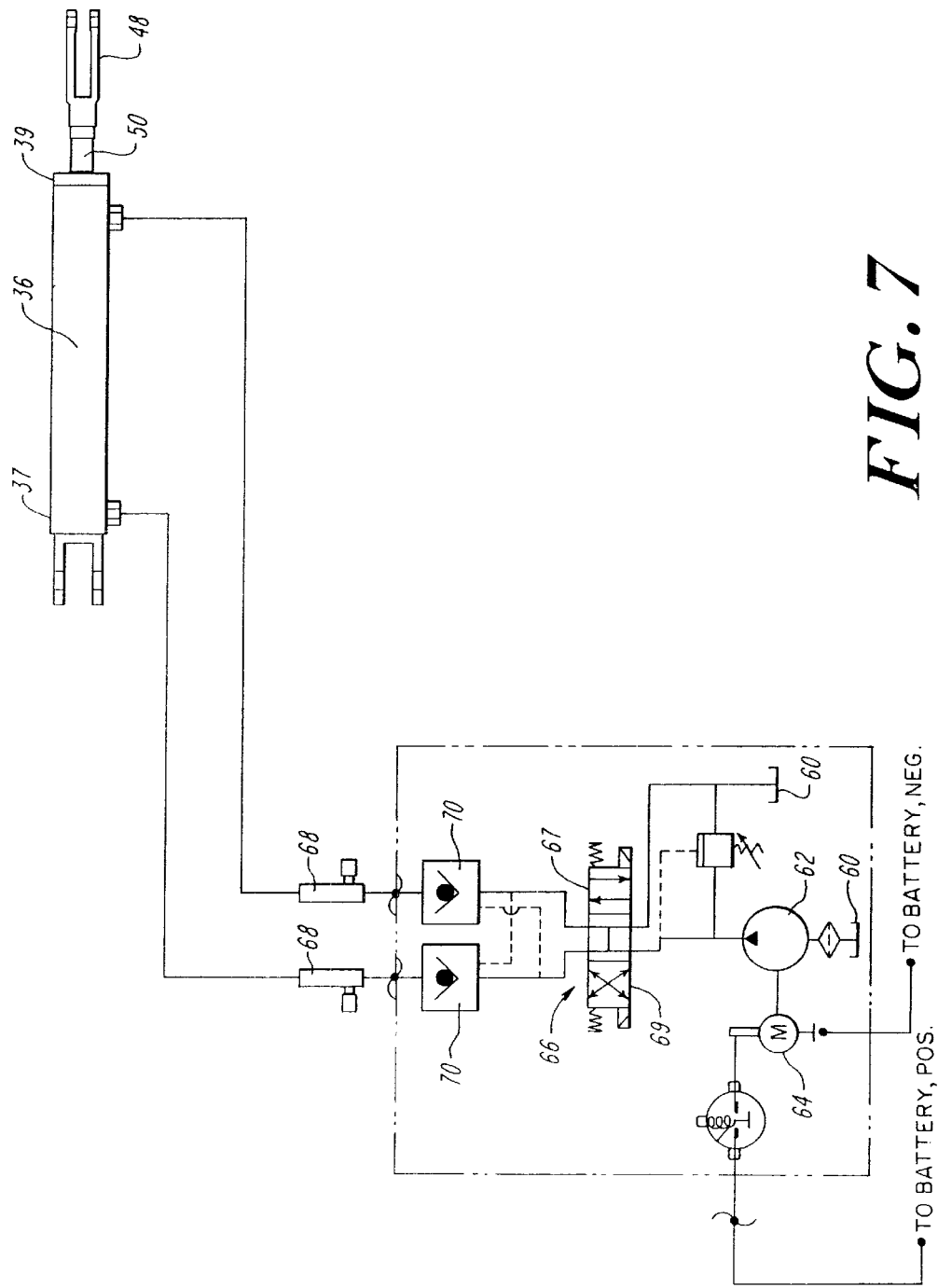
FIG. 7 is a schematic of a hydraulic circuit operative to actuate the rotation actuation mechanism of FIG. 1.
Figure 8:
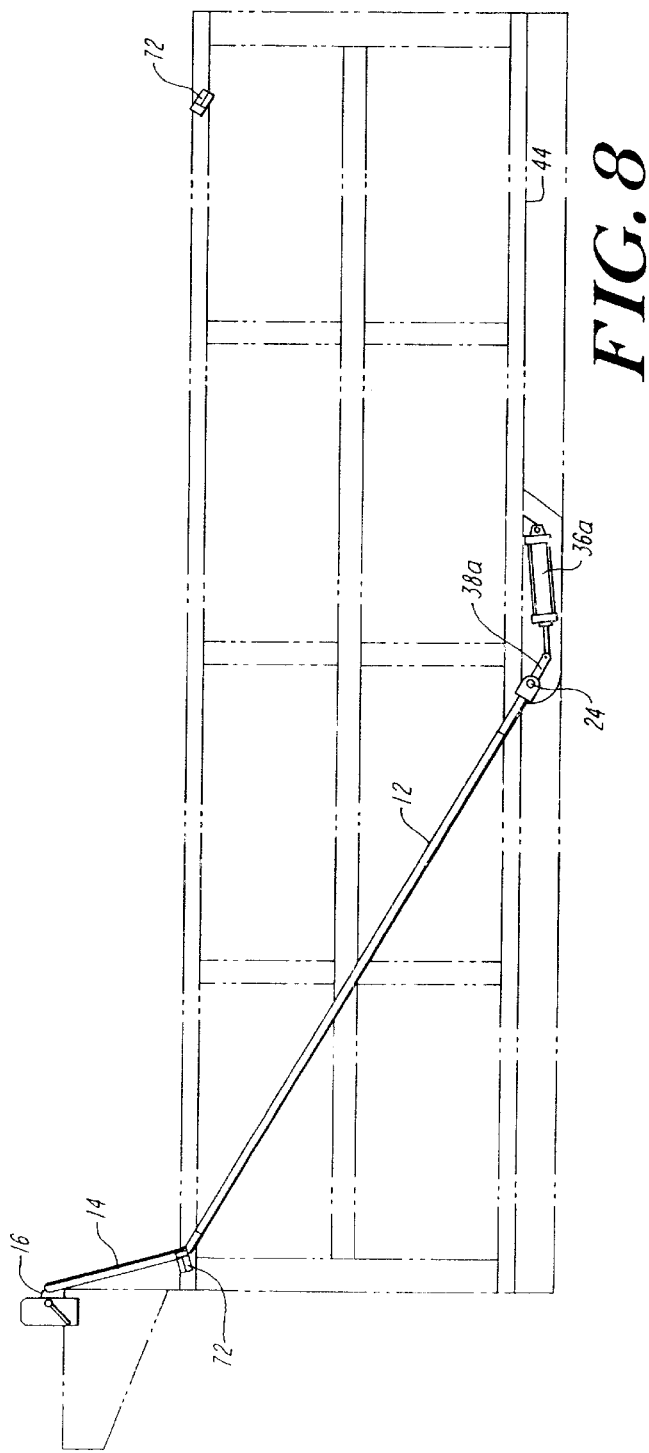
FIG. 8 is a side view of a pneumatically actuated covering system according to the present invention.
Figure 9:
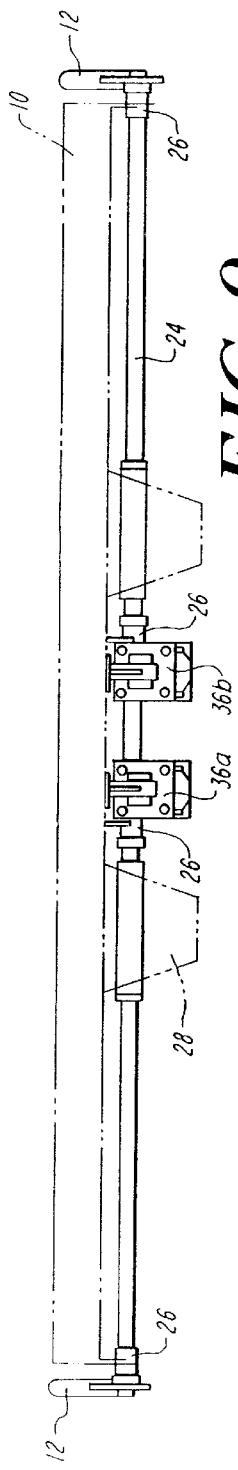
FIG. 9 is a partial rear view of the covering system of FIG. 8.
Figure 10:
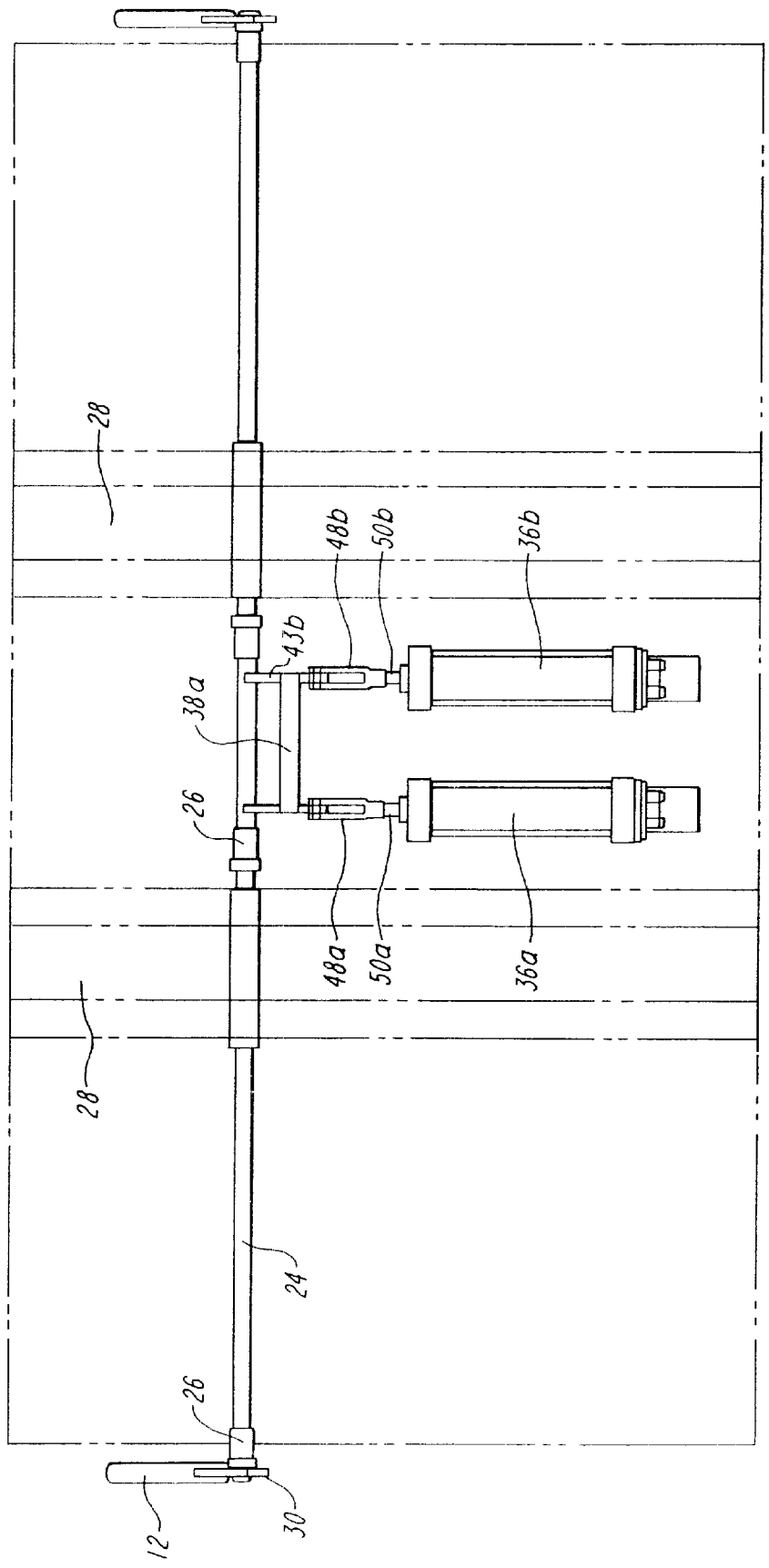
FIG. 10 is a bottom view of the covering system of FIG. 8.
Figure 11:
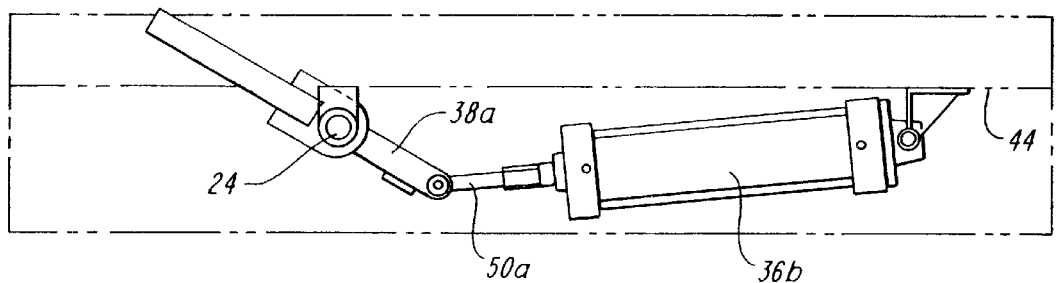
FIG. 11 is a partial side view of a rotation actuation mechanism operative with the system of FIG. 8.
Figure 12:
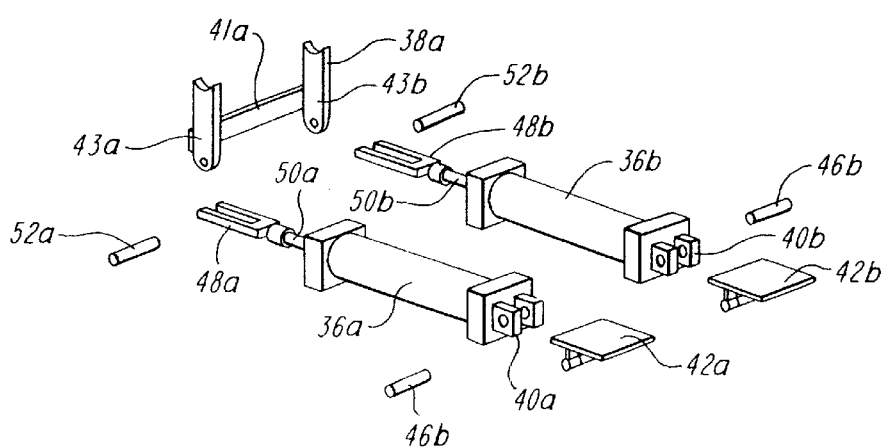
FIG. 12 is an exploded view of the rotation actuation mechanism of FIG. 11.

A hydraulic circuit suitable for operating the rotation actuation mechanism is illustrated in FIG. 7. Hydraulic fluid stored in a reservoir 60 is supplied via a pump 62, operated by a suitable motor 64, to a solenoid-operated fluid valve 66. The fluid reservoir 60 may be part of the truck's central hydraulic system, or may be separately provided for the covering system. In a first position 67 of the solenoid valve 66, the fluid flows to the base end 37 of the cylinder to extend the rod 50. Fluid from the yoke end 39 flows toward the reservoir 60. In a second position 69 of the solenoid valve 66, fluid flows in the opposite direction to the yoke end 39 of the cylinder to retract the rod. Fluid from the base end 37 flows toward the reservoir. Appropriate flow controllers 68 and check valves 70 are provided in the fluid lines. The flow controllers 68 limit the speed of the arm movement and prevent the arms 12 from slamming into bow rests 72 on the container body 10. The check valves 70 are fluidly coupled such that, during actuation, both check valves open in response to flow on either line toward the cylinder 36, which allows flow in either direction along the fluid lines. When the flow is stopped, the check valves close to prevent fluid from leaking back toward the reservoir, thereby maintaining the cylinder in the appropriate position. The pump motor 64 and the solenoid valve 66 are electrically coupled to be actuated concurrently such that the solenoid valve 66 opens when the pump 62 turns on, to prevent fluid pressure build up in the lines. Preferably, a switch is provided in the cab of the truck to be convenient for the operator. For example, the operator pushes and holds in an appropriate button until the cover reaches the end of its stroke. In this embodiment, the solenoid valve 66 returns to the middle position when the button is released and the pump 62 turns off. The check valves 70 ensure the cylinder 36 is maintained in the appropriate position by hydraulic pressure.

When it is desired to cover the load, the operator pushes the button on the switch, which in turn energizes the pump motor 64 and fluid valve 66 to pump hydraulic fluid to the base end 37 of the cylinder 36, extending the rod 50. The rod and yoke push against the bell crank assembly 38, which causes the shaft 24 to rotate, thereby moving the arms 12 from the uncovered to the covered position. As the cover and arms move toward the rear of the body, the spring contained within the roller assembly 22 becomes biased, thereby storing energy for the uncover operation. When the arms 12 reach the rear of the truck, the operator releases the switch, and the arms 12 stop moving and are held in place by hydraulic pressure.

When it is desired to uncover the load, the operator pushes the uncover button on the switch, which in turn energizes the pump motor 64 and fluid valve 66 to pump hydraulic fluid to the rod end 39 of the cylinder 36, retracting it. The cylinder pulls against the bell crank assembly 38, which causes the shaft 24 to rotate in the opposite direction, thereby moving the arms 12 from the covered to the uncovered position. As the cover and arms move toward the front of the truck, the energy that was previously stored in the roller assembly 22 becomes available to wind the cover onto the roller for storage. When the arms 12 reach the front of the body, the operator releases the switch and the arms 12 stop moving and are held in place by hydraulic pressure.

In a further embodiment of the invention, illustrated in FIGS. 8–13, a pneumatically operated rotation actuation mechanism is provided. The pivot arms 12 and shaft 24 are similar to the hydraulically operated embodiment described above. The rotation actuation mechanism 34 is also mounted underneath the container body 10, generally in the middle thereof. The mechanism preferably includes two pneumatic cylinders 36a and 36b. A clevis 40a, 40b is provided at one end of each cylinder for mounting to a bracket 42a, 42b that is fixed to the underside 44 of the container body, for example, by welding or bolting. Clevis pins 46a, 46b with cotters fit through aligned openings on the devises and brackets to allow pivoting motion about a common axis defined by both pins. A U-shaped yoke 48a, 48b is provided at the rod end 39a, 39b of each cylinder. A bellcrank assembly 38a is pivotably attached to the yokes with clevis pins with cotters. The bellcrank assembly includes two members 43a, 43b attached with a crossbar 41a and rigidly fastened to a midpoint of the shaft 24, as by welding. Actuation of the pneumatic cylinders 36a, 36b to extend or retract the rods 50a, 50b causes the bellcrank assembly 38a to pivot about a common axis defined by the clevis pins 52a, 52b, thereby causing rotation of the shaft.

Figure 13:
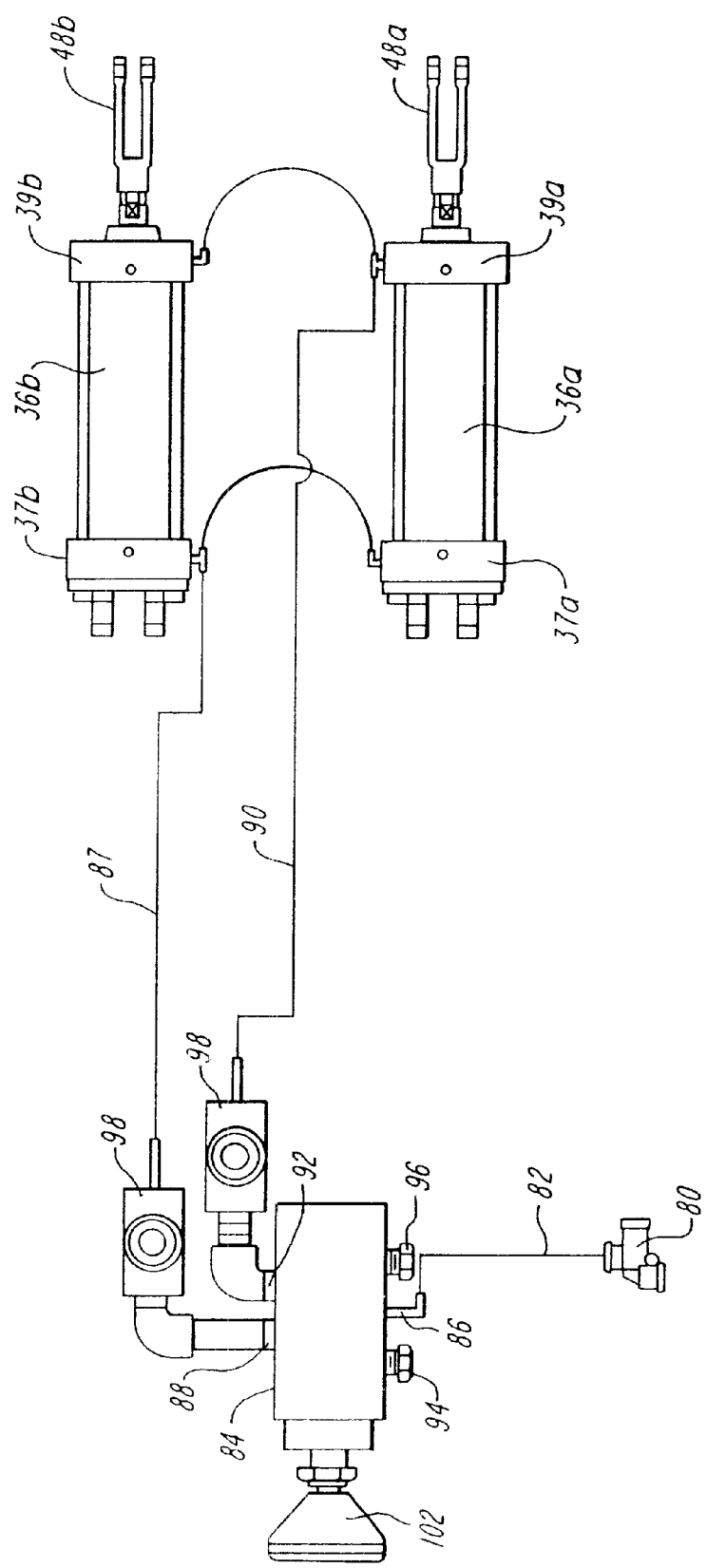
FIG. 13 is a schematic of a pneumatic circuit operative to actuate the rotation actuation mechanism of FIG. 8.

A pneumatic circuit suitable for operating the rotation actuation mechanism is illustrated in FIG. 13. Compressed air from a compressed air source (not shown) is supplied via a pressure protection valve 80 and air line 82 to an inlet port 86 of an air valve 84. Because the compressed air source is used by a truck's braking system, which requires maintenance of a minimum air pressure in the air lines to prevent brake lock-up, the pressure protection valve 80 shuts off air to the covering system if the air pressure drops below the preselected minimum air pressure.

From the air valve 84, a line 87 leads from a port 88 to the base end 37a, 37b of the pneumatic cylinders 36a, 36b for extension of the rods 50a, 50b and yokes 48a, 48b. A line 90 leads from the rod end 39a, 39b of the pneumatic cylinders to a port 92 on the air valve for retraction of the rods and yokes. Exhaust ports 94, 96 for each line are provided on the air valve. Flow controllers 98 are provided in the lines 87, 90 to the air valve 84 to limit the speed of the arm movement and prevent the arms from slamming into the bow rests 72 on the container body 10. A knob 102 is provided on the air valve for operator actuation. For example, the operator pushes the knob in to cover the container body and pulls the knob out to uncover the body. Preferably, the air valve is mounted in the cab of the truck.

In another embodiment of the present invention, a powered tensioning device 110 is provided, illustrated in FIGS. 14–19. The tensioning device includes a hoop 112 formed of a cross bar 114 fixed to the ends of two bowed arms 116. The bowed arms are rigidly connected to a shaft 118 that is mounted for rotation transversely across the front of the container body 10. The shaft may, for example, be mounted to the container body directly underneath the cab shield 120. Any suitable rotatable mounting mechanism may be used, such as bushings 122 bolted or welded to the body. Upon rotation about the pivot axis, the cross bar 114 travels along an arcuate path between an uncovered position near the top of the roller mechanism 22 and a covered position adjacent the top 124 of the container body 10. In the covered position, the hoop 112 holds the cover 16 down close to the top of the container body.

Figure 14:
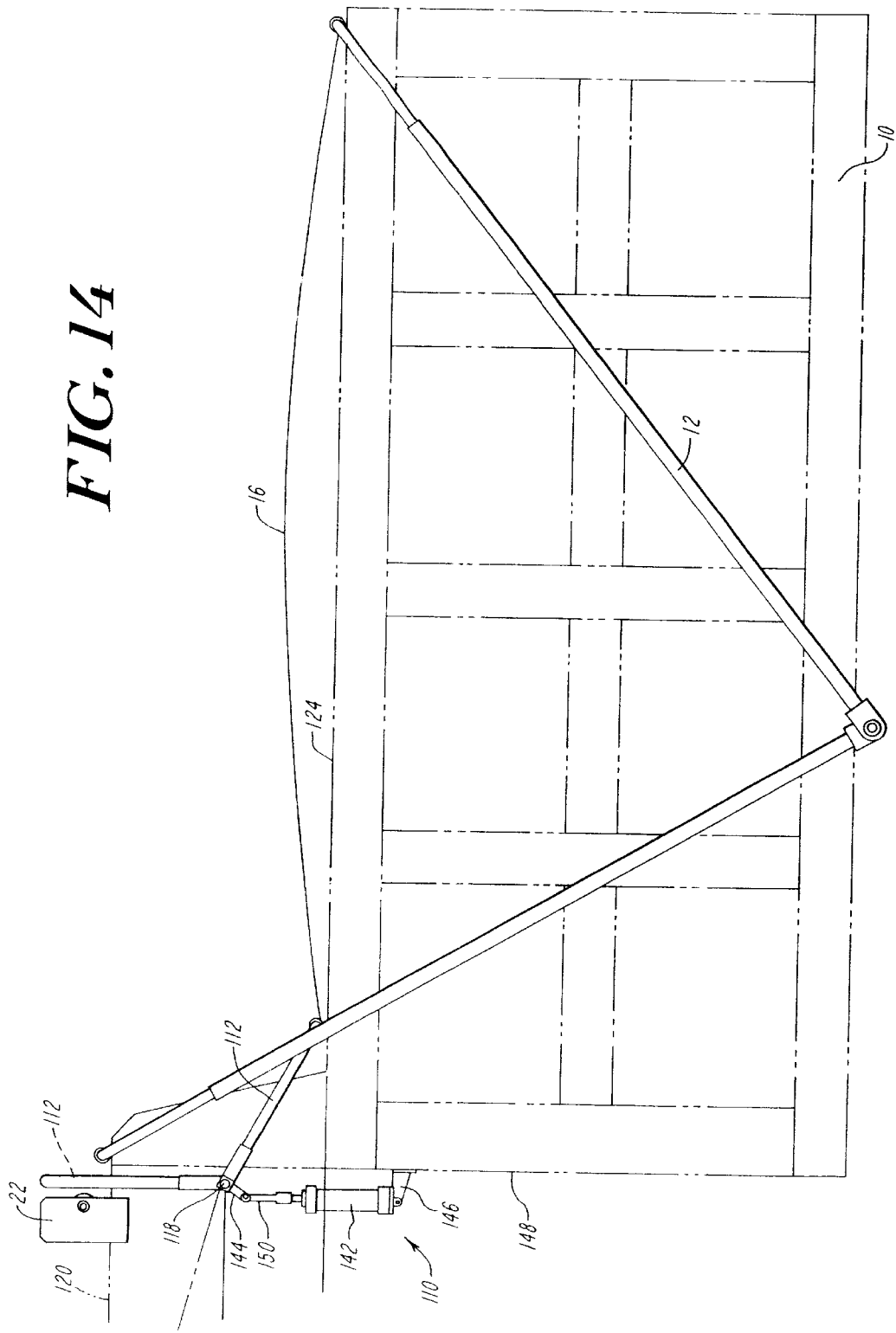
FIG. 14 is a side view of a cover hold down tensioning device according to the present invention.
Figure 15:
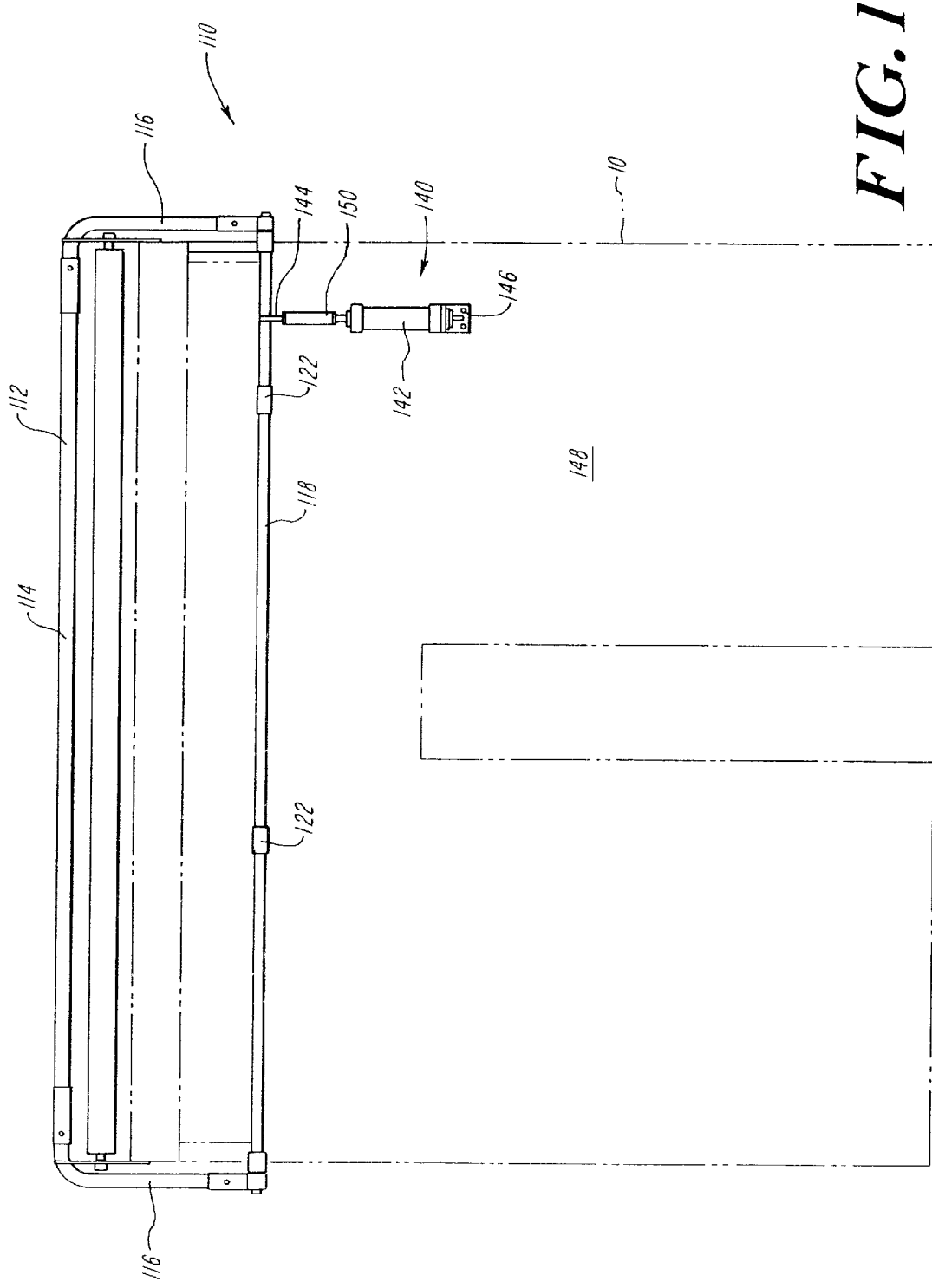
FIG. 15 is a front view of the tensioning device of FIG. 14.
Figure 16:
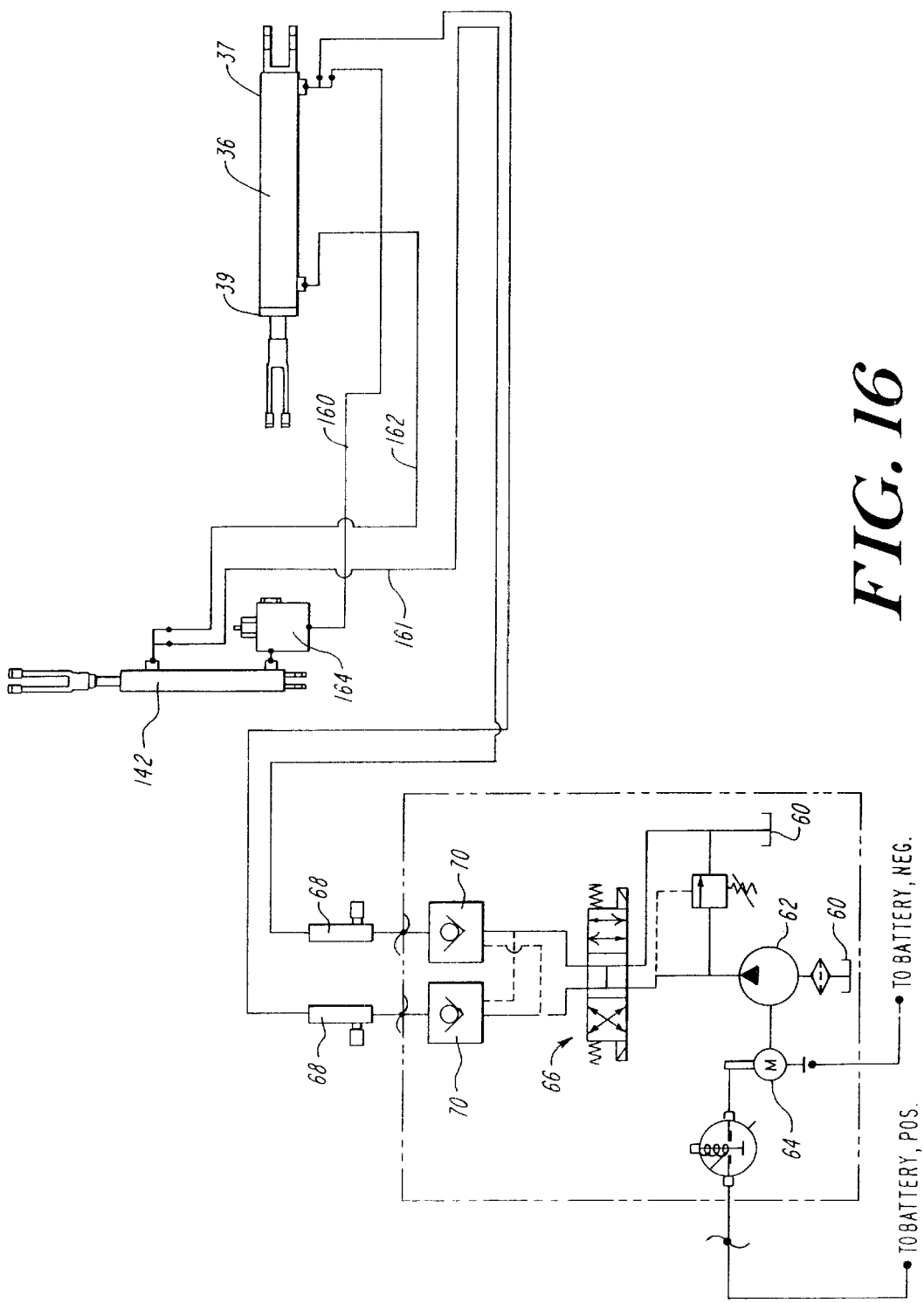
FIG. 16 is a hydraulic circuit operative to actuate the covering system and tensioning device according to the present invention.
Figure 17:
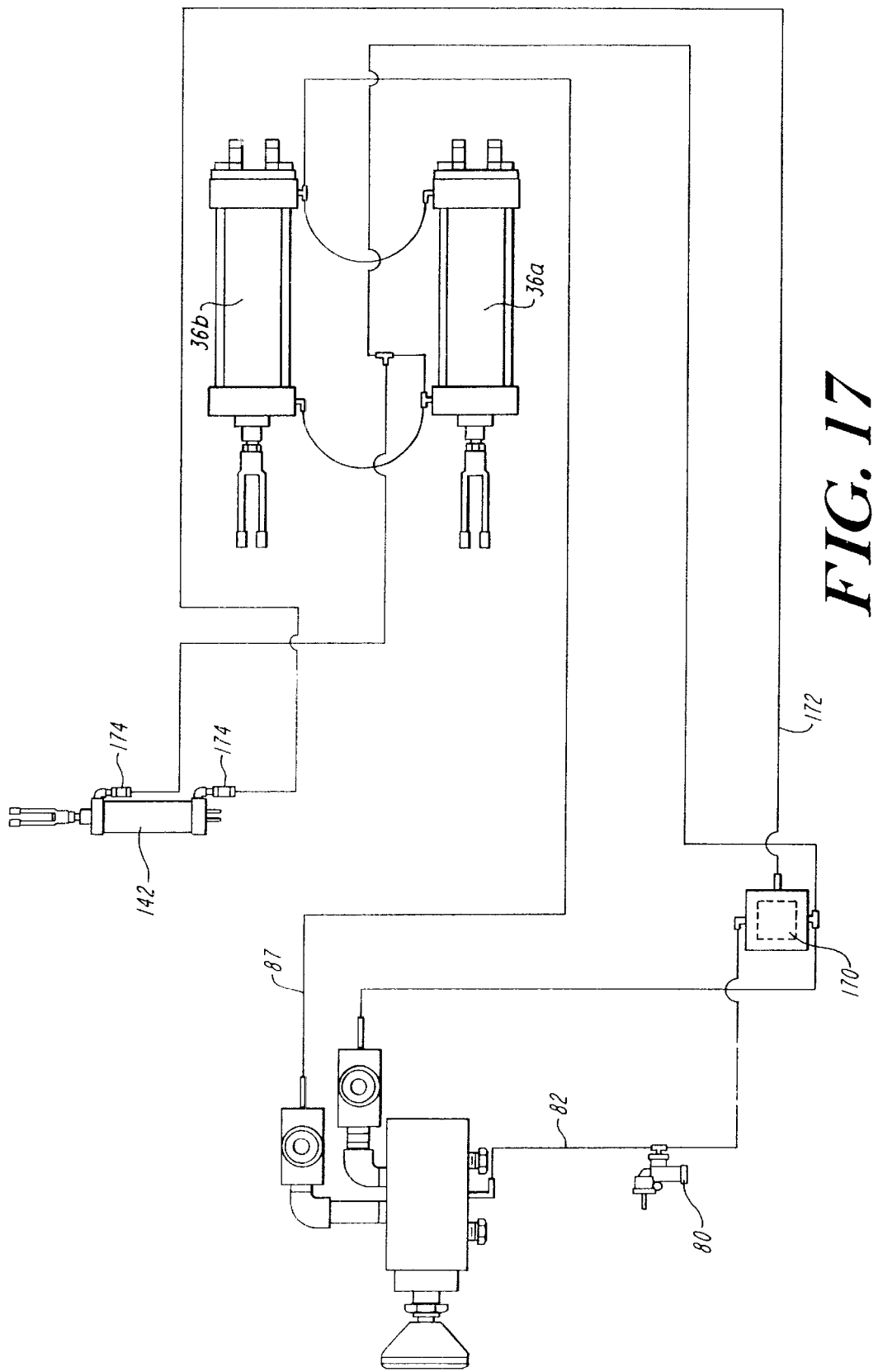
FIG. 17 is a pneumatic circuit operative to actuate the covering system and tensioning device according to the present invention.
Figure 18:
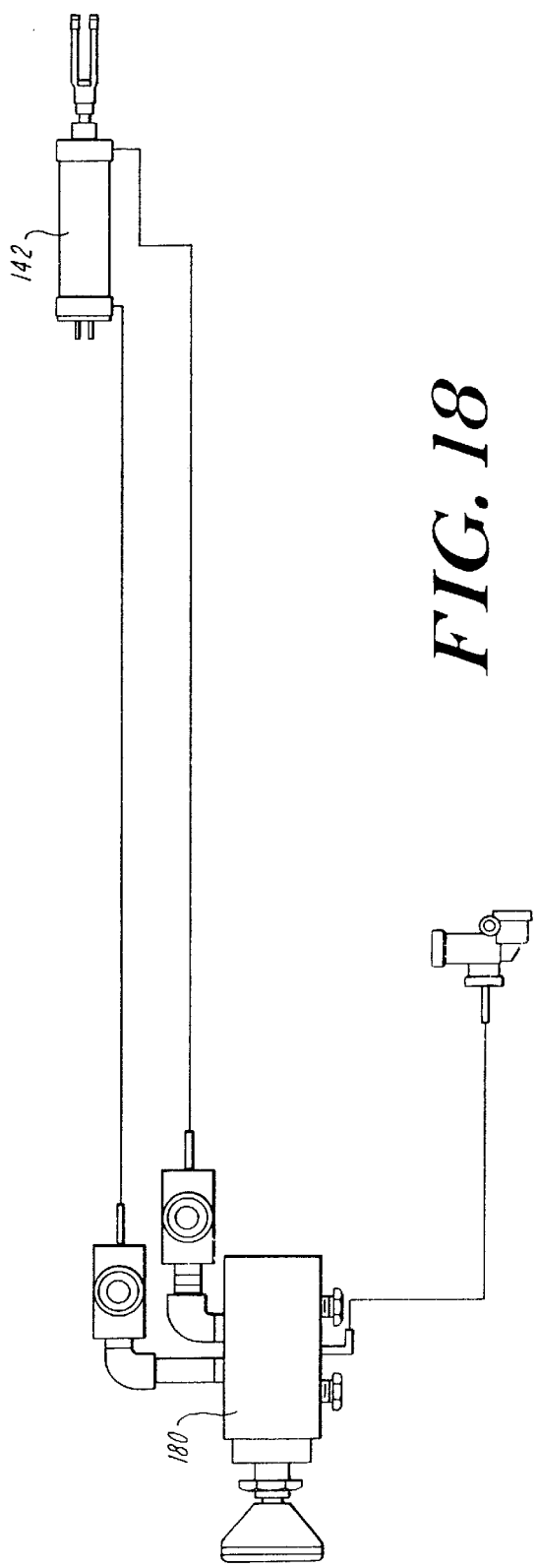
FIG. 18 is a further embodiment of a pneumatic circuit operative to actuate the tensioning device according to the present invention.
Figure 19:
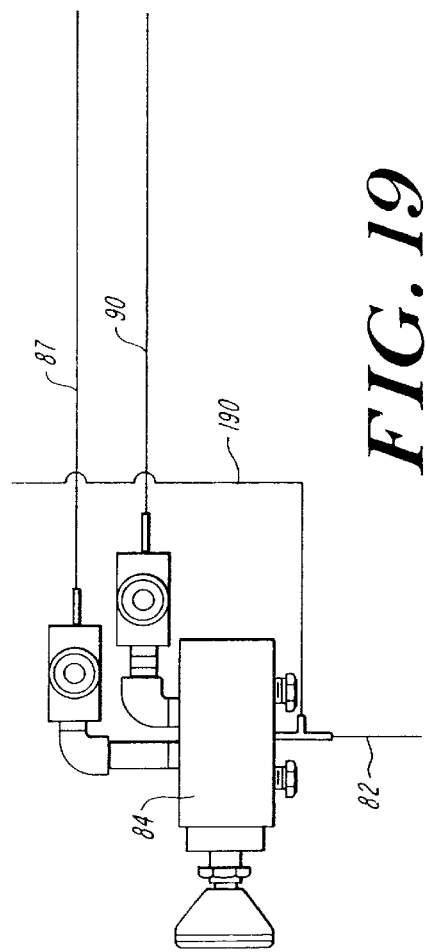
FIG. 19 is a still further embodiment of a pneumatic circuit operative to actuate the tensioning device according to the present invention.

When the cover 16 is rolled up within the roller mechanism 22, the hoop 112 is stored in a retracted position, in which the bowed arms 116 are preferably vertical, so that the hoop 112 does not interfere with extension or retraction of the cover 16. After the cover has been extended over the top of the container body, the hoop 112 is rotated downwardly, sliding over the cover until the cover is held in tension close to the top 124 of the container body 10, as best illustrated in FIG. 14.

Figure 20:
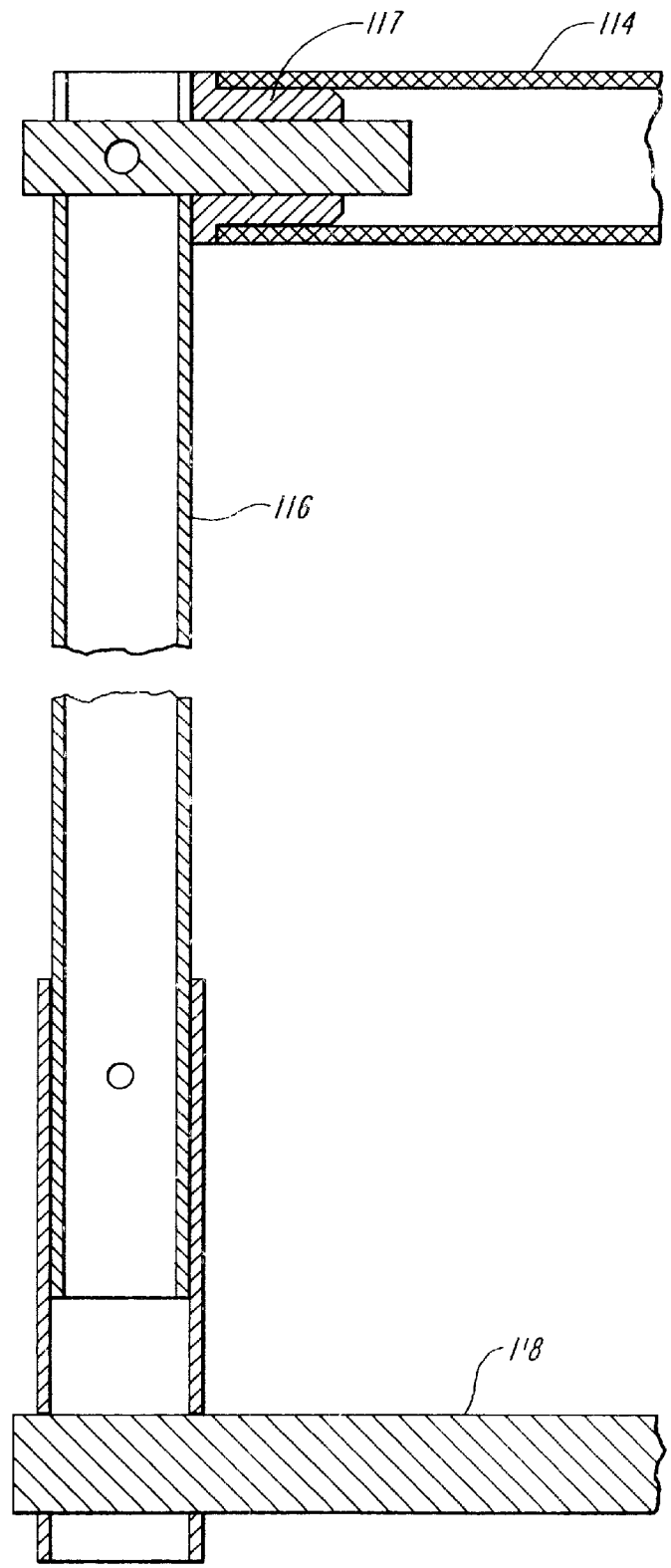
FIG. 20 is a partial cross-sectional view of a further embodiment of the tensioning device using a rolling cross bar.

The cross bar 114 may be rigidly fixed to the arms 116, for sliding contact with the cover 16. Alternatively, the cross bar 114 may be rotatably mounted to the arms 116 with, for example, a suitable rotatable bearing 117, indicated in FIG. 20. The rolling cross bar rolls as it contacts the cover, minimizing friction with and subsequent wear of the cover.

A rotation actuating mechanism 140 is provided to cause rotation of the shaft 118. In the preferred embodiment, the mechanism includes a cylinder 142, which may be hydraulic or pneumatic, and a bellcrank assembly 144 connected between the cylinder 142 and the shaft 118 for converting linear motion of the cylinder to rotary motion of the shaft. The cylinder is fixedly mounted at the base end by a bracket 146 to the front bulkhead 148 of the container body, for example, by welding or bolting. The cylinder may be mounted to the bulkhead anywhere that does not interfere with existing equipment. A U-shaped yoke 150 is provided at the rod end of the cylinder 142. The bellcrank assembly 144 is pivotably attached to the yoke 150 with a clevis pin with a cotter. The bellcrank assembly 144 includes a scalloped end that fits the curvature of the shaft and that is rigidly fastened to the shaft, as by welding. Actuation of the cylinder to extend or retract the rod causes the bellcrank assembly to pivot about the axis defined by the clevis pin, thereby causing rotation of the shaft.

The tensioning device 110 may be actuated using the hydraulic circuit provided to actuate the covering system, described above. See FIG. 16. Fluid lines 160, 161, 162 continue from the covering system cylinder 36 to the tensioning device cylinder 142. A flow sequencer 164 is provided to ensure that, during extension, the tensioning device is not actuated until the cover is extended over the container body 10 and to ensure that, during retraction, the tensioning device is retracted before the cover is retracted. For example, the flow sequencer 164 prevents hydraulic fluid from entering the base end of the cylinder 142 until a preselected pressure is reached, preferably the pressure when the pivot arms 12 are at the back end of the container body. During retraction, hydraulic fluid flows preferentially into the tensioning device cylinder 142 before flowing into the covering system cylinder 36, due to less resistance in the cylinder 142, thereby retracting the tensioning device before retracting the cover. Alternatively, a separate hydraulic circuit may be provided for the tensioning device.

In another embodiment, the tensioning device 110 may be actuated using the pneumatic circuit provided to actuate the covering system, described above. See FIG. 17. A flow sequencer 170 is provided in the line from the air valve to the cylinder. During extension of the cover, the sequencer 170 senses air returning from the rod ends of the cylinders 36a, 36b. When the return air flow from the cylinders 36a, 36b has ceased, indicating that the cover is fully extended, the sequencer opens to allow air flow to the base end of the cylinder 142 on line 172, causing the tensioning device to rotate downwardly onto the cover. During retraction, air flows preferentially to the rod end of the cylinder 142 due to less resistance, causing the tensioning device to retract before the cover. After the tensioning device retracts, air flows to the rod ends of the cylinders 36a, 36b, causing retraction of the cover. Flow controllers 174 are provided at the cylinder 142 to control the speed of movement. Alternatively, a separate air valve 180 may be provided to operate the tensioning device cylinder, for example, if the tensioning device is installed on a truck with a preexisting manual or electric covering system. See FIG. 18. If an existing pneumatic covering system is already installed on the truck, a supply line 190 may be provided from the existing supply line to deliver air to the air valve of the tensioning system. See FIG. 19.

It will be appreciated that the rotation actuation mechanism and tensioning device can be embodied in other manners, as would be apparent to those of skill in the art. The invention is not to be limited by what has been particularly shown and described, except as indicated by the appended claims.

What is claimed is:
1. A covering system for a container body having an open top, comprising:

a container body having an open top;

a roller mechanism and a cover rollably mounted to the roller mechanism, the cover having a leading edge and a trailing edge, the trailing edge fixed to the roller mechanism;

a pair of pivot arms, each pivot arm having an upper end attached to the leading edge of the cover;

a shaft transversely disposed and rotatably supported by an underside of the container body, each pivot arm having a lower end fixedly attached to ends of the shaft for rotation with the shaft;

a rotation actuation mechanism mounted to the underside of the container body;

a tensioning device comprising a hoop rotatably mounted to a front of the container body to travel an arcuate path between an uncovered position near a top of the roller mechanism and a covered position holding down the cover close to a top of the container body;

a tensioning device actuation mechanism; and a sequencing mechanism operatively coupled to the rotation actuation mechanism and the tensioning device actuation mechanism to actuate the rotation actuation mechanism to begin covering the container body before actuating the tensioning device actuation mechanism during a covering operation and to actuate the tensioning device actuation mechanism before finishing uncovering the container body during an uncovering operation.

2. The covering system of claim 1, wherein the rotation actuation mechanism is hydraulically actuated, comprising a hydraulic circuit operative to drive the rotation actuation mechanism in a first direction to cover the container body with the cover and in a second direction to uncover the container body, or is pneumatically actuated, comprising a pneumatic circuit operative to drive the rotation actuation mechanism in a first direction to cover the container body with the cover and in a second direction to uncover the container body.

3. The covering system of claim 2, wherein the rotation actuation mechanism comprises a linear to rotary conversion mechanism.

4. The covering system of claim 2, wherein the rotation actuation mechanism comprises a bell crank assembly and a cylinder, the bell crank assembly pivotably connected to a rod end of the cylinder and fixedly connected to the shaft.

5. The covering system of claims 4 further comprising a yoke pivotably connected at one end to the rod end of the cylinder, the bell crank assembly pivotably connected to an opposite end of the yoke.

6. The covering system of claims ,4 further comprising a plurality of cylinders, the bell crank assembly pivotably connected to rod ends of the plurality of cylinders.

7. The covering system of claim 4 wherein the cylinder is hydraulic or pneumatic.

8. The covering system of claim 2, wherein the hydraulic circuit includes a pump and a fluid valve operatively coupled to cause fluid to flow to the rotation actuation mechanism.

9. The covering system of claim 2, wherein the pneumatic circuit includes a compressed air source and an air valve operatively coupled to cause air to flow to the rotation actuation mechanism.

10. The covering system of claim 2, wherein the shaft is disposed generally at a midpoint between front and rear ends of the container body.

11. The covering system of claim 2, wherein the shaft is supported for rotation by a plurality of bushings fixedly attached to the underside of the container body.

12. The covering system of claim 2, wherein the container body comprises a dump truck body.

13. The covering system of claim 2, wherein the rotation actuation mechanism further includes a switch disposed within a dump truck cab.

14. The covering system of claim 1, wherein the tensioning device actuation mechanism is hydraulically or pneumatically actuated.

15. The covering system of claim 1, wherein the rotation actuation mechanism and the tensioning device actuation mechanism are hydraulically actuated, and further comprising a hydraulic circuit operative to drive the hydraulically actuated rotation actuation mechanism and the tensioning device actuation mechanism.

16. The covering system of claim 15, wherein the sequencing mechanism further comprises a flow sequencing mechanism operative to actuate the rotation actuation mechanism to begin covering the container body before actuating the tensioning device actuation mechanism during a covering operation and to actuate the tensioning device actuation mechanism before finishing uncovering the container body during an uncovering operation.

17. The covering system of claim 1, wherein the rotation actuation mechanism and the tensioning device actuation mechanism are pneumatically actuated, and further comprising a pneumatic circuit operative to drive the pneumatically actuated rotation actuation mechanism and the tensioning device actuation mechanism.

18. The covering system of claim 17, wherein the sequencing mechanism further comprises a flow sequencing mechanism operative to actuate the rotation actuation mechanism to begin covering the container body before actuating the tensioning device actuation mechanism during a covering operation and to actuate the tensioning device actuation mechanism before finishing uncovering the container body during an uncovering operation.

19. A covering system for a container body having an open top, comprising:

a container body having an open top;

a roller mechanism and a cover rollably mounted to the roller mechanism, the cover having a leading edge and a trailing edge, the trailing edge fixed to t he roller mechanism;

a pair of pivot arms, each pivot arm having an upper end attached to the leading edge of the cover, each pivot arm mounted for rotation to the container body;

a tensioning device comprising a hoop rotatably mounted to a front of the container body to travel an arcuate path between an uncovered position near a top of the roller mechanism and a covered position holding down the cover close to a top of the container body; and a pneumatic or hydraulic actuation mechanism operative to cause rotation of the hoop along the arcuate path.

20. The covering system of claim 19, further comprising:

a hydraulic or pneumatic arm rotation actuation mechanism coupled to the pair of pivot arms; and a flow sequencing mechanism operative to actuate the arm rotation actuation mechanism to begin covering the container body before actuating the actuation mechanism of the hoop during a covering operation and to actuate the actuation mechanism of the hoop before finishing uncovering the container body during an uncovering operation.

21. The covering system of claim 19, wherein the container body comprises a dump truck body.

* * * * *

UNITED STATES PATENT AND TRADEMARK OFFICE
CERTIFICATE OF CORRECTION

PATENT NO.     : 6,464,283 B2
DATED          : October 15, 2002
INVENTOR(S)    : Edward N. Haddad, Jr.

It is certified that error appears in the above-identified patent and that said Letters Patent is hereby corrected as shown below:

Column 4,
Line 63, "devises" should read -- clevises --;

Column 7,
Line 46, "claims 4" should read -- claim 4, --;
Line 50, "claims ,4" should read -- claim 4, --;
Line 53, "claim 4" should read -- claim 4, --;

Column 8,
Line 3, "claim 2," should read -- claim 12, --; and
Line 42, "t he" should read -- the --.

Signed and Sealed this

Fifteenth Day of July, 2003

JAMES E. ROGAN
*Director of the United States Patent and Trademark Office*